(12) United States Patent
Chiang et al.

(10) Patent No.: US 6,529,503 B1
(45) Date of Patent: Mar. 4, 2003

(54) APPARATUS AND METHOD FOR STORING HEADER INFORMATION IN A NETWORK SWITCH

(75) Inventors: John Chiang, San Jose, CA (US); Ching Yu, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/315,970

(22) Filed: May 21, 1999

(51) Int. Cl.[7] .............................................. H04L 12/56
(52) U.S. Cl. ...................................... 370/363; 370/429
(58) Field of Search ................................ 370/351, 352, 370/353, 354, 355, 356, 357, 360, 362, 363, 368, 371, 379, 386, 389, 400, 422, 428, 429

(56) References Cited

U.S. PATENT DOCUMENTS

| | | | |
|---|---|---|---|
| 5,515,376 A | | 5/1996 | Murthy et al. |
| 5,809,514 A | * | 9/1998 | Nasserbakht et al. .......... 711/3 |
| 5,915,099 A | * | 6/1999 | Takata et al. ................ 710/100 |
| 5,953,335 A | * | 9/1999 | Erimli et al. ................ 370/390 |
| 6,052,751 A | * | 4/2000 | Runaldue et al. ............ 710/107 |
| 6,084,856 A | * | 7/2000 | Simmons et al. ............ 370/235 |
| 6,084,878 A | * | 7/2000 | Crayford et al. ............ 370/389 |
| 6,111,874 A | * | 8/2000 | Kerstein ...................... 370/389 |
| 6,115,387 A | * | 9/2000 | Egbert et al. ................ 370/423 |
| 6,167,475 A | * | 12/2000 | Carr ............................ 710/113 |
| 6,181,702 B1 | * | 1/2001 | Egbert ......................... 370/401 |
| 6,192,028 B1 | * | 2/2001 | Simmons et al. ............ 370/229 |
| 6,236,654 B1 | * | 5/2001 | Egbert ......................... 370/392 |
| 6,249,521 B1 | * | 6/2001 | Kerstein ...................... 370/389 |
| 6,260,073 B1 | * | 7/2001 | Walker et al. ............... 709/249 |
| 6,310,876 B1 | * | 10/2001 | Egbert ......................... 370/389 |
| 6,356,551 B1 | * | 3/2002 | Egbert ......................... 370/389 |
| 6,400,715 B1 | * | 6/2002 | Beaudoin et al. ........... 370/392 |
| 6,445,709 B1 | * | 9/2002 | Chiang ........................ 370/399 |

* cited by examiner

*Primary Examiner*—Hassan Kizou
*Assistant Examiner*—Anh-Vu H Ly

(57) ABSTRACT

A network switch configured for switching data packets across multiple ports uses an external memory to store data frames. A scheduler controls access to the external memory based on predetermined arbitration logic. When a data frame is transmitted to the external memory, a portion of the data frame is stored on the switch for processing by decision making logic to generate frame forwarding information. The data frame is then transmitted back to the switch for transmission through the appropriate port(s) on the switch.

18 Claims, 13 Drawing Sheets

APPARATUS AND METHOD FOR STORING HEADER INFORMATION IN A NETWORK SWITCH

TECHNICAL FIELD

The present invention relates to network communications and more particularly, to storing frame information in a network switch prior to processing by a decision making engine.

BACKGROUND ART

In computer networks, a plurality of network stations are interconnected via a communications medium. For example, Ethernet is a commonly used local area network scheme in which multiple stations are connected to a single shared serial data path. These stations often communicate with a switch located between the shared data path and the stations connected to that path. Typically, the switch controls the communication of data packets on the network.

The network switch includes switching logic for receiving and forwarding frames to the appropriate destinations. One arrangement for generating a frame forwarding decision uses a direct addressing scheme, where the network switch includes a fixed address table storing switching logic for the destination addresses.

For example, a frame may be received by the network switch with header information indicating the source address and destination address of the frame. The switching logic accesses the fixed address table using the source address and destination address as lookups to find the appropriate frame forwarding information. The switch then uses this information and sends the frame to the appropriate port(s).

When all of the stations connected to the network are simultaneously operating, packet traffic on the shared serial path can be heavy with little time between packets. Accordingly, many prior art systems transmit the data frame to an external memory for storage prior to processing. However, the data frame must then be transmitted back to the switch for processing by a decision making device. This is a time-consuming process that decreases the speed with which the data is transmitted to its destination. With increased network throughput requirements, such a processing arrangement often results in an unacceptable delay in forwarding frames to their respective destinations.

Another drawback with typical prior art systems that employ external memory devices to store data frames is that each data port is coupled to a separate internal bus that is then coupled to the external memory interface. The large number of internal buses increases the chip size and creates contention problems associated with transferring the data to the external memory.

SUMMARY OF THE INVENTION

There exists a need for a switching device that enables data to be transferred to an external memory, while permitting a portion of the data to be stored on the switching device for processing by a decision making device.

There is also a need for a switching device that enables a portion of a data frame to be stored on the switching device in an efficient manner.

These and other needs are met by the present invention, where a multiport switch uses an external memory to store data frames. As the data frames are transmitted to the external memory, a portion of the data frame is stored on the multiport switch for processing by a decision making engine. The decision making engine generates frame forwarding information while the frame is stored in the external memory. The data frame is then transmitted back to the switch for transmission through the appropriate port(s) on the switch.

According to one aspect of the invention, a multiport switch is configured to control the communication of data frames between stations. The switch includes a receive device configured to receive a data frame and transmit the data frame on an internal bus to an external memory interface. The switch also includes a decision making engine configured detect when data frame information is being transmitted on the internal bus and to store a portion of the data frame on the multiport switch, when the decision making engine detects data frame information is being transmitted on the internal bus.

Another aspect of the present invention provides a method for storing data frame information in a multiport switch that controls communication of data frames between stations. The method includes receiving a data frame and transmitting the data frame on an internal bus to an external memory interface. The method also includes detecting when data frame information is being transmitted on the internal bus. The method further includes storing a portion of the data frame on the multiport switch, when transmission of data frame information on the internal bus is detected.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BEST MODE FOR CARRYING OUT THE INVENTION

The present invention will be described with the example of a switch operating in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
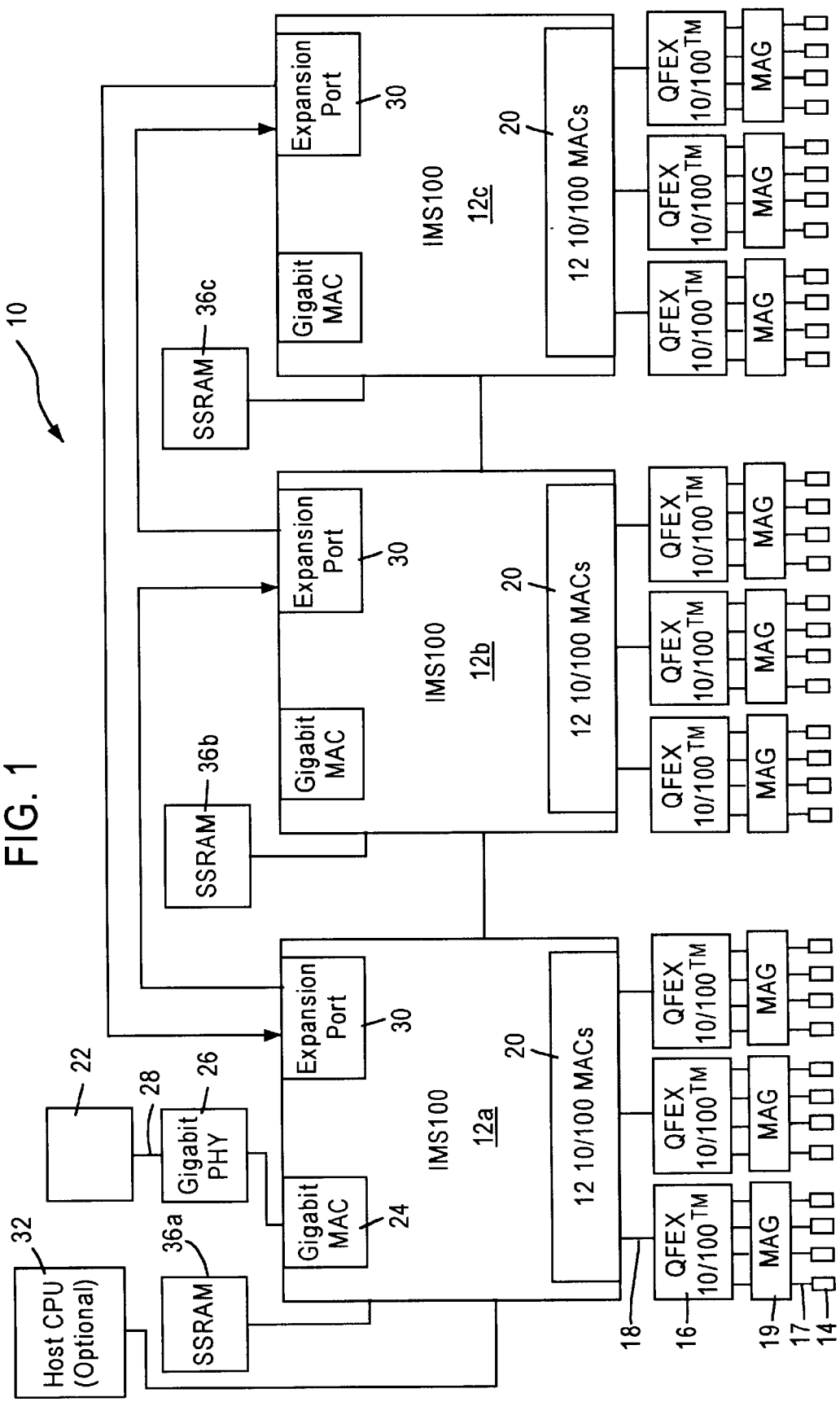
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective shared media independent interfaces (MII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished or prioritized over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding shared media independent interface (MII) 18. In particular, each 10/100 PHY transceiver 16 is configured for sending and receiving data packets between the multiport switch 12 and up to four (4) network stations 14 via the shared MII 18. A magnetic transformer 19 provides AC coupling between the PHY transceiver 16 and the corresponding network medium 17. Hence, the shared MII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. For example, each expansion port 30 can be implemented as a second gigabit MAC port similar to port 24, thereby enabling multiple multiport switches 12 to be cascaded together as a separate backbone network.

Figure 2:
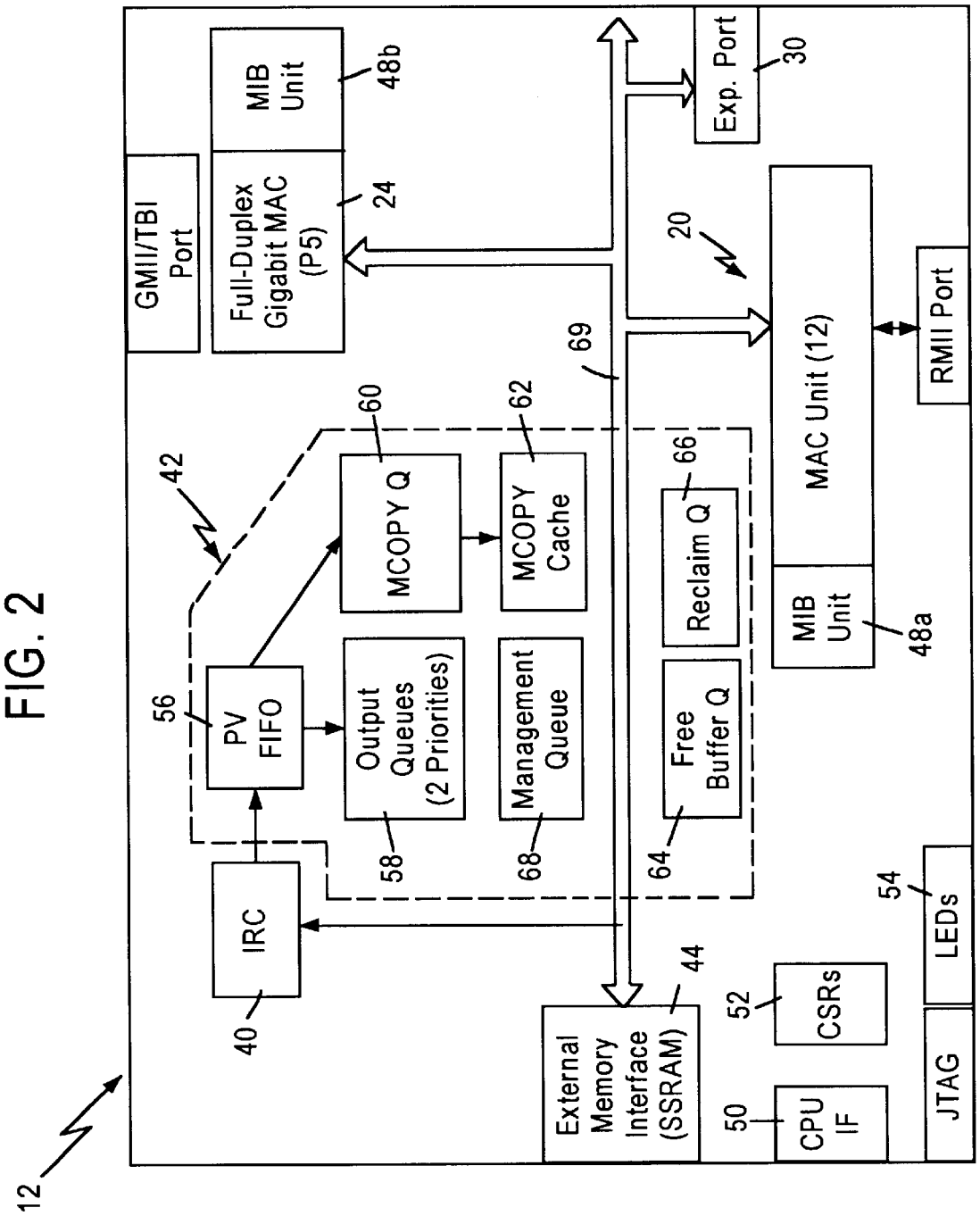
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data, memory structures, and MIB counter information. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above. The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received from one source to at least one destination station.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer. The IRC 40 "snoops on" (i.e., monitors) the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, or all ports (i.e., broadcast). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should receive the data frame, Rx port number, an untagged set field, VLAN information, opcode, and frame pointer. The format of the forwarding descriptor will discussed further with respect to FIG. 7. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 fetch the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are fetched from the respective output queues 58, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that can be reclaimed by the free buffer queue 64 as free pointers. After being returned to the free buffer queue 64, the frame pointer is available for reuse by the MAC unit 20 or the gigabit MAC unit 24.

Figure 3:
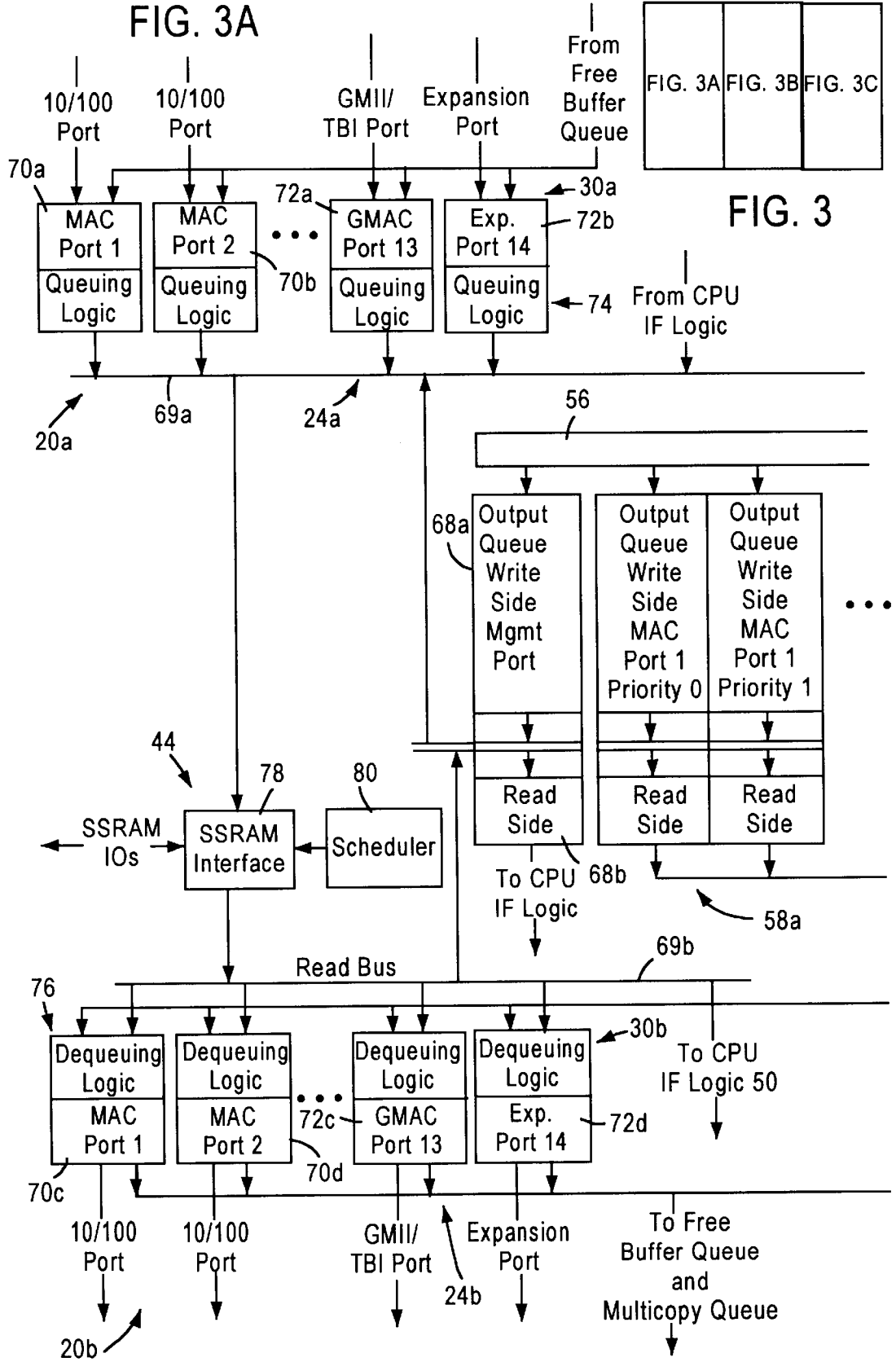
FIG. 3 is a detailed block diagram illustrating the switching subsystem of FIG. 2.
Figure 3B:
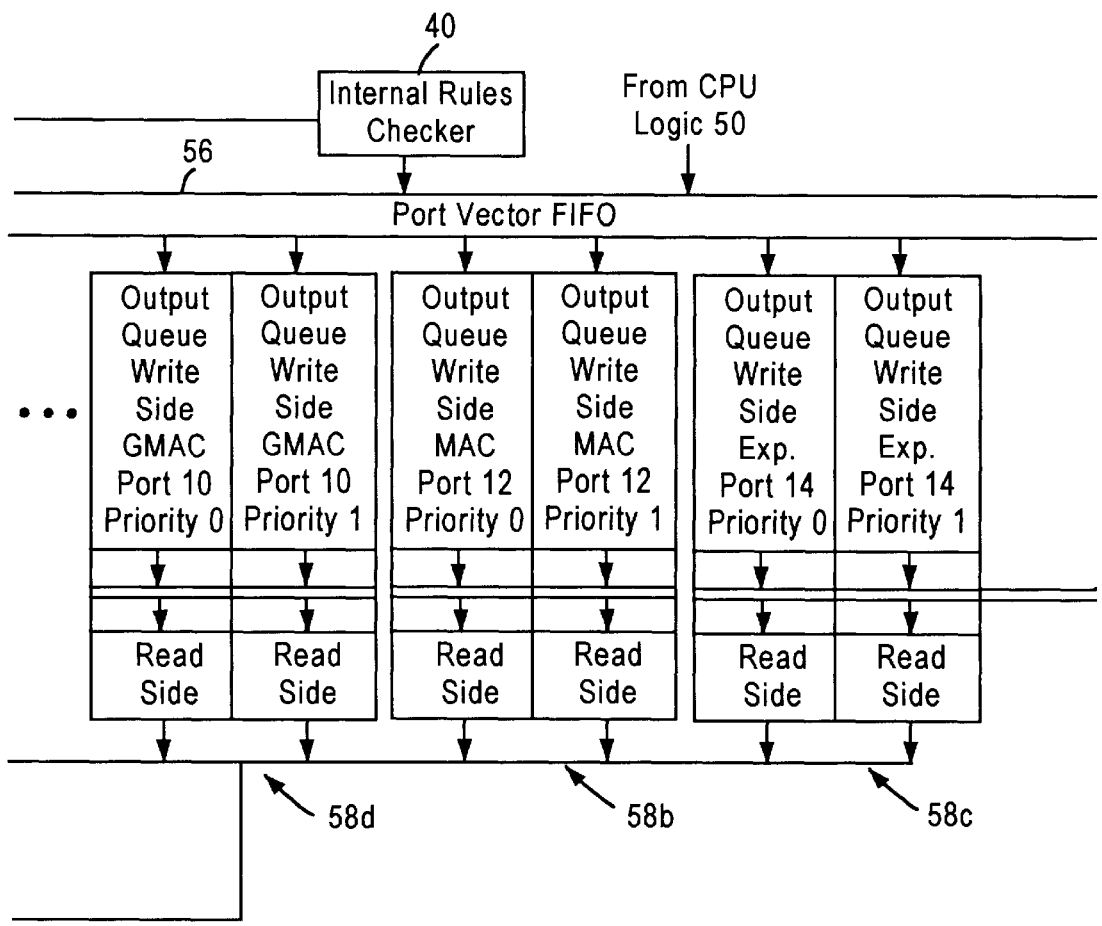
Figure 3C:
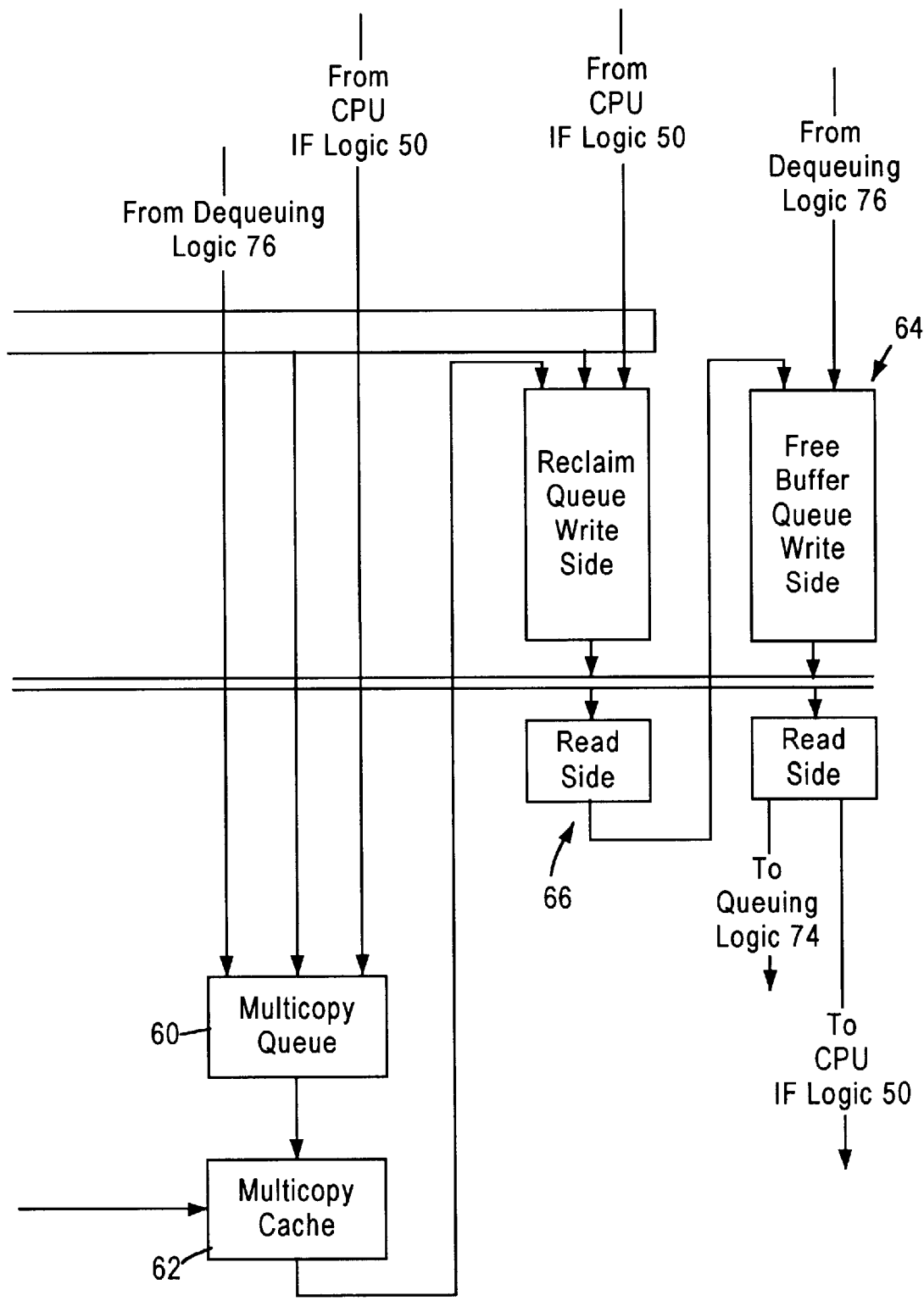

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot based on the retrieved frame pointer. The frame data is stored in the location pointed to by the free buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frame pointers, and a low priority queue for low priority frame pointers. The high priority frame pointers are used for data frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the frame pointer specifies a unicopy transmission, the frame pointer is returned to the free buffer queue 64 following writing the frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 are described below.

STORING HEADER INFORMATION IN THE SWITCH

The present invention is directed to a method and apparatus for storing a portion of a data frame within the multiport switch 12 for processing by the IRC 40. As described previously, each of the receive MAC modules illustrated in FIG. 3 includes queuing logic 74 for transferring received data from the corresponding internal receive FIFO to the external memory 36 and the IRC 40. The queuing logic 74 first fetches a frame pointer from the free buffer queue 64 and then uses the fetched frame pointer to store a received data packet to the external memory 36, via the external memory interface 44. The queuing logic 74 stores the frame at the location specified by the frame pointer, as described in more detail below.

The external memory interface 44, illustrated in FIG. 3, includes a scheduler 80 for controlling external memory 36 access by the queuing logic 74 or dequeuing logic 76 of any switch port and an SSRAM interface 78 for performing the read and write operations with the external memory 36. The scheduler 80 controls the access to external memory 36 to optimize usage of the bandwidth of the external memory 36. Advantageously, the use of scheduler 80 to control the transmission of data to the external memory 36 avoids contention problems associated with transmitting data from a plurality of independent devices to external memory 36.

SSRAM interface 78, according to the exemplary embodiment of the invention, includes a 64-bit wide data path and a 17-bit wide address path for transmitting data to external memory 36 and is designed to run at a 100 MHz clock rate. In alternative configurations, the SSRAM interface 78 may be designed having other physical sizes and to run at other clock rates, based on the particular network requirements.

External memory 36 is pipelined so that a series of zero-wait-state read or write accesses are able to be processed with a new address presented each clock cycle, as long as the series consists of only read accesses or only write accesses. Within a sequence of accesses, each access may be an individual transfer having an independent address associated with the transfer and is not limited to a burst transmission involving only a single address. When changing from a write transfer to a read transfer, external memory 36 requires an overhead of two turn-around cycles and when changing from read to write, external memory 36 requires one turn-around cycle.

Figure 4:
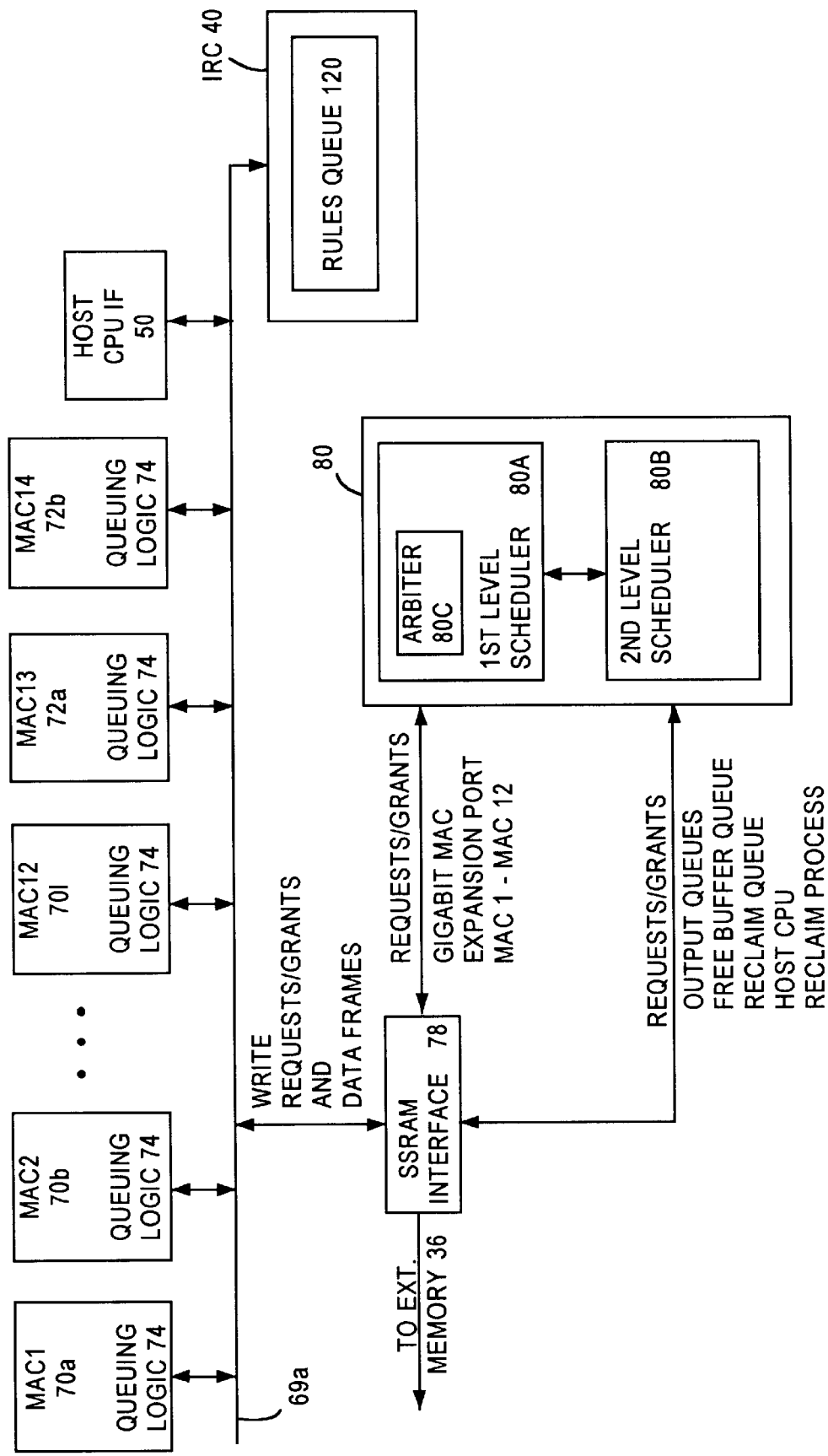
FIG. 4 is a detailed block diagram of a system including the external memory interface of FIG. 3 in accordance with an embodiment of the present invention.

According to an exemplary embodiment of the invention illustrated in FIG. 4, scheduler 80 is a two-level scheduler comprising a first level scheduler 80a and a second level scheduler 80b. The first level scheduler 80a allocates a fixed bandwidth to each of the twelve 10/100 Mb/s ports. According to the exemplary embodiment, the first level scheduler 80a allocates 200 Mb/s of bandwidth to each of the 10/100 Mb/s ports. In alternative configurations, other amounts of bandwidth can be allocated based on the particular network requirements.

The first level scheduler 80a also allocates a fixed amount of bandwidth to the gigabit port and the expansion port. In the exemplary embodiment of the invention, the gigabit port and the expansion port share two gigabits/second of bandwidth that is controlled by arbiter 80c. Arbiter 80c is designed to give transmission priority to the gigabit port over the expansion port. That is, the arbiter 80c is designed to give the gigabit port access to bus 69a any time both the gigabit port and the expansion port are active. The output queues, control queues and host CPU share a fixed amount of bandwidth to external memory 36 that is arbitrated by a second level scheduler 80b, as described in more detail below.

In order to reduce the overhead of read-to-write and write-to-read turn-around cycles, the scheduler 80 groups reads by all ports and queues into no-wait-state pipelined read sequences, and writes into no-wait-state pipelined write sequences. Additionally, in order to ensure that each device receives adequate memory bandwidth, the scheduler 80 interleaves, within each read or write sequence, fixed time slots assigned to different devices that access external memory 36.

The fixed time slots together form an arbitration cycle. Each time slot in the arbitration cycle is equivalent to one clock cycle in duration (a "1-clock slot") and each 1-clock slot is allocated to a single port or queue based on the predetermined priority. Each port or queue makes a single 64-bit wide transfer to external memory 36 within its 1-clock slot.

As described previously, the gigabit MAC port and the expansion port share the same bandwidth allocation. Since these two ports are both designed to support high speed channels, scheduler 80 allocates 10 times more bandwidth to these ports than to the 10/100 Mb/s ports. Accordingly, the scheduler 80 allocates ten times as many 1-clock slots to the gigabit port and the expansion port together as each of the 10/100 Mb/s ports is allocated. Additionally, as discussed previously, arbiter 80c gives priority to the gigabit port over the expansion port. This means that the slots reserved for the gigabit port and the expansion port are able to be used by the expansion port only when the gigabit port is not requesting access. Thus, if the gigabit port is not in use, the entire two gigabit per second bandwidth is allocated to the expansion port. However, when the gigabit port is active, 100 Mb/s of bandwidth is allocated for the expansion port, interleaved with the slots allocated to the other ports. Advantageously, this ensures that data from the expansion port gets processed even when the gigabit port is active.

The output queues, control queues and the host CPU external memory accesses share a set of time slots in the arbitration cycle. Access to these slots is controlled through access requests by the respective devices to the second level scheduler 80b and a predetermined access priority. The access priority of the output queues, control queues and host CPU 32, according to the exemplary embodiment of the invention, is illustrated in Table 1 below.

TABLE 1

Output and Control Queue Slot Allocation

| Priority | Block |
|---|---|
| 1 | Free Buffer Queue Overflow |
| 2 | Reclaim Processor |
| 3 | Reclaim Queue Overflow |
| 4 | GMAC & Exp. Port (Ports 13 & 14) Output Queue Priority 1 Overflow |
| 5 | GMAC & Exp. Port (Ports 13 & 14) Output Queue Priority 0 Overflow |
| 6–17 | Ports 1–12 Output Queue Priority 1 Overflow |
| 18–29 | Port 1–12 Output Queue Priority 0 Overflow |
| 30 | Management Output Queue Overflow |
| 31 | Host CPU External Memory Access |

Referring to Table 1, among the output queues, control queues and host CPU accesses, the free buffer queue has the highest priority to access external memory 36 and the host CPU has the lowest priority. For example, if the free buffer queue has issued an access request to second level scheduler 80b for use of a designated queue slot, it will always be granted that slot. However, if the reclaim queue has issued a request for the queue slot, the reclaim queue will only be granted use of the slot if the free buffer queue has not requested the slot in the time period prior to the grant being provided. The host CPU 32 will only be granted access to a slot when none of the other control queues/output queues illustrated in Table 1 has requested access in the time period prior to the grant being provided. In alternative configurations, the particular access priority may be modified based on the particular network requirements.

As described above, the external memory interface 44 including scheduler 80 enables data frames to be stored to external memory 36 in an efficient manner while avoiding bus contention problems. The present invention also enables a portion of the data frame to be stored in the IRC 40 while simultaneously being transmitted over write bus 69a to SSRAM interface 78. The IRC 40 accomplishes this by snooping on, i.e., monitoring, write bus 69a to determine when a data frame is being transmitted to SSRAM interface 78. The IRC 40 then stores the frame pointer value and the header information of the received data frame within the multiport switch 12. The header information includes the source address and destination address of the frame, along with VLAN tag information when the VLAN tag information is transmitted with the data frame. The IRC 40 processes the header information, as described in more detail below, and is able to identify the appropriate output MAC ports through which the data frame is to be transmitted. Advantageously, snooping on write bus 69a enables the IRC 40 to generate the data forwarding information in an efficient manner while the data frame is being stored in external memory 36. The stored data frame is then transmitted back to the multiport switch via read bus 69b for eventual transmission through the appropriate output port(s).

Figure 5:
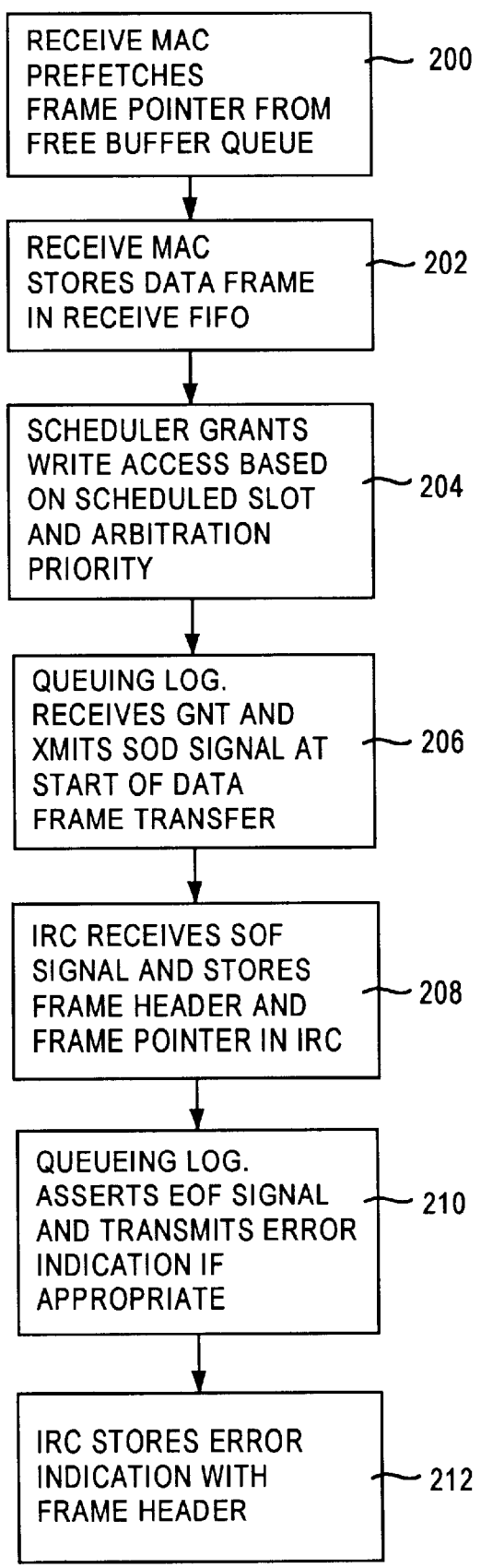
FIG. 5 is a flow diagram illustrating the method of storing frame header information in a network switch according to an embodiment of the present invention.

FIG. 5 is a flow diagram illustrating the method for storing frame header information in the multiport switch 12 according to an exemplary embodiment of the invention. At step 200, each receive MAC queuing logic 74 prefetches a frame pointer from the free buffer queue in advance of any received data. Each receive MAC queuing logic 74 also prefetches a pointer to the next buffer in external memory 36 from the free buffer queue and caches these address pointers pending the arrival of data frames. Advantageously, this saves processing time associated with obtaining a frame pointer after a data frame has been received by the receive MAC.

Next, at step 202, the multiport switch 12 receives an incoming data frame and the corresponding receive MAC stores the frame in an internal FIFO. The scheduler 80, at step 204, then grants a write access to the queuing logic 74 to initiate a transfer over write bus 69a during the time slot scheduled for that particular port. As discussed previously, the scheduler 80 pipelines write accesses to bus 69a in order to reduce overhead associated with writing data to external memory 36. Accordingly, the scheduler 80 grants a series of write accesses to the respective queuing logic blocks 74 based on the predetermined slots in the arbitration cycle. The respective queuing logic 74, after receiving the grant for access to the write bus 69a and after the receive FIFO has captured at least 64 bytes of a frame, begins the transfer of data in a direct memory access (DMA) transaction during the assigned time slot, at step 206. The queuing logic 74 begins the transfer by transmitting an internal Start of Frame (SOF) signal onto write bus 69a. In the exemplary embodiment of the invention, the SOF signal is asserted during the transfer of the first 8 bytes of data from the receive FIFO to the SSRAM interface 78.

The IRC 40 receives the SOF signal at step 208 and is thereby alerted that a write to external memory 36 is underway. This allows the IRC 40 to snoop on the write bus 69a and capture frame header information along with the frame pointer information. That is, the IRC 40 stores the first 40 bytes of the receive frame, in parallel with the transfer of the data frame on write bus 69a to SSRAM interface 78. The first 40 bytes of the receive frame includes the destination address, source address and VLAN information, when the VLAN information is included with the received data frame.

According to the exemplary embodiment of the invention, the IRC 40 stores the frame header information along with the frame pointer information in rules queue 120, illustrated in FIG. 4. According to an exemplary embodiment of the invention illustrated in FIG. 6, the rules queue 120 is a 4-deep queue allocated for each receive port, i.e., the queue corresponding to each receive port holds four frame headers and frame pointers. However, in alternative configurations, the rules queue 120 may be configured to store other numbers of frame headers for each port, based on the particular network requirements.

After a data frame has been completely transferred to external memory 36, the queuing logic 74 asserts an End of Frame (EOF) signal and provides frame status information, at step 210, indicating whether the frame was received at the multiport switch 12 with errors. More specifically, when the queuing logic 74 detects an error in the received data, the queuing logic 74 asserts an RX_ERR signal over write bus 69a. The IRC 40 receives the RX_ERR signal and stores an error indication in the rules queue 120, along with the corresponding frame header, at step 212. When the frame with the error is later processed by the IRC 40, the IRC 40 creates a forwarding descriptor with a null port vector so that the frame will be discarded.

Once the EOF has been signaled by the queuing logic 74 and the frame status information has been stored in rules queue 120, the IRC 40 begins processing the header information to generate the forwarding descriptor, as described in detail below. Advantageously, this enables the present invention to store data frames in external memory while storing the frame header information on the multiport switch for processing by the IRC 40. This enables data forwarding decisions to be made in an efficient manner, thereby increasing data throughput as compared to typical prior art switches that transmit data frames to external memory devices.

Figure 6:
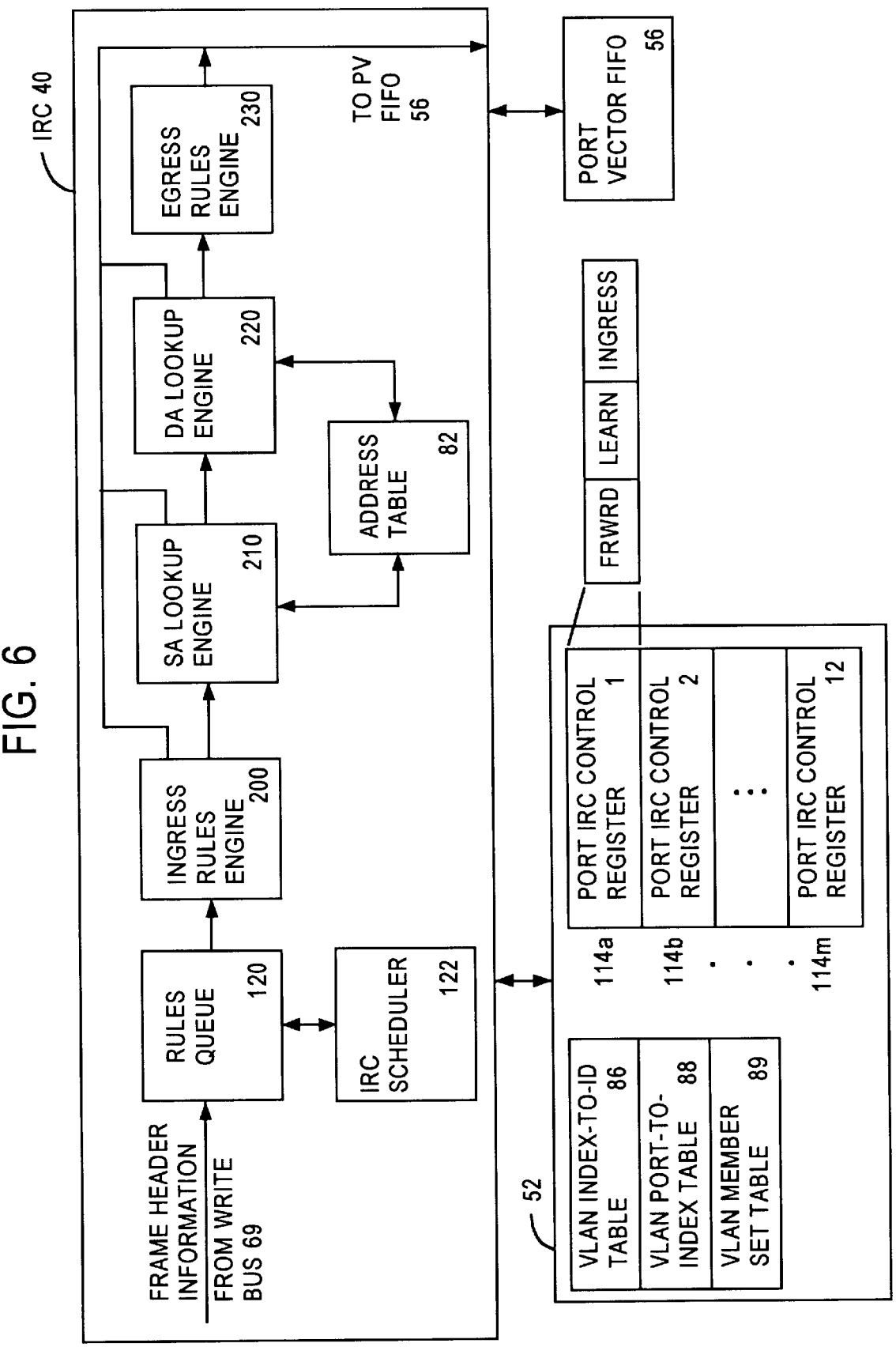
FIG. 6 is a block diagram of a system including the internal rules checker of FIG. 2 in accordance with an embodiment of the present invention.

As described above, according to an exemplary embodiment of the invention illustrated in FIG. 6, the IRC 40 includes an IRC rules queue 120. The rules queue 120 monitors the number of entries present at each port. When a queue for a receive port has three entries, the IRC 40 signals flow-control/back-pressure logic associated with that receive port in order to regulate network activity, the details of which are not disclosed herein in order not to unduly obscure the thrust of the present invention.

The IRC 40 also includes an IRC scheduler 122 to facilitate processing the frame headers in an orderly manner. In alternative embodiments the IRC rules queue 120 and IRC scheduler 122 may be located external to the IRC 40 on another part of the switch 12 or even external to the switch 12. The operations of the IRC 40 in processing the frame header information are described in detail below.

According to the exemplary embodiment, the IRC 40 includes four functional logic blocks, an ingress rules engine 200, a source address (SA) lookup engine 210, a destination address (DA) lookup engine 220 and an egress rules engine 230. In the exemplary embodiment, the four engines 200, 210, 220 and 230 are employed as separate logic devices. In other words, each engine is designed in a modular fashion to receive input from other devices and to perform its particular functions without relying on processing logic from another logic engine. Advantageously, this modular architecture allows changes to be made to any of the particular logic engines without affecting other parts of the decision making process. However, in alternative configurations, the individual functions performed by each logic engine, discussed in detail below, as well as the particular number of logic engines may be modified, based on the particular network requirements.

The IRC 40 also includes address table 82. However, in alternative embodiments, the address table 82 may be located outside the IRC 40 within another part of the multiport switch 12 or even external to the multiport switch 12. According to the exemplary embodiment, the address table 82 supports 4096 user addresses and capabilities for 64 unique virtual local area networks (VLANs). However, the number of addresses and VLANs supported may be increased by expanding the table size. VLANs provide "broadcast domains" whereby broadcast traffic is kept "inside" the VLAN. For example, a specific VLAN may contain a group of users at a high level of an organization. When sending data to this group of users, the data may include a specific VLAN identifier associated with this particular group to ensure that only these users receive the data. These VLAN groupings can be thought of as "sub-networks" within a larger network.

Figure 7:
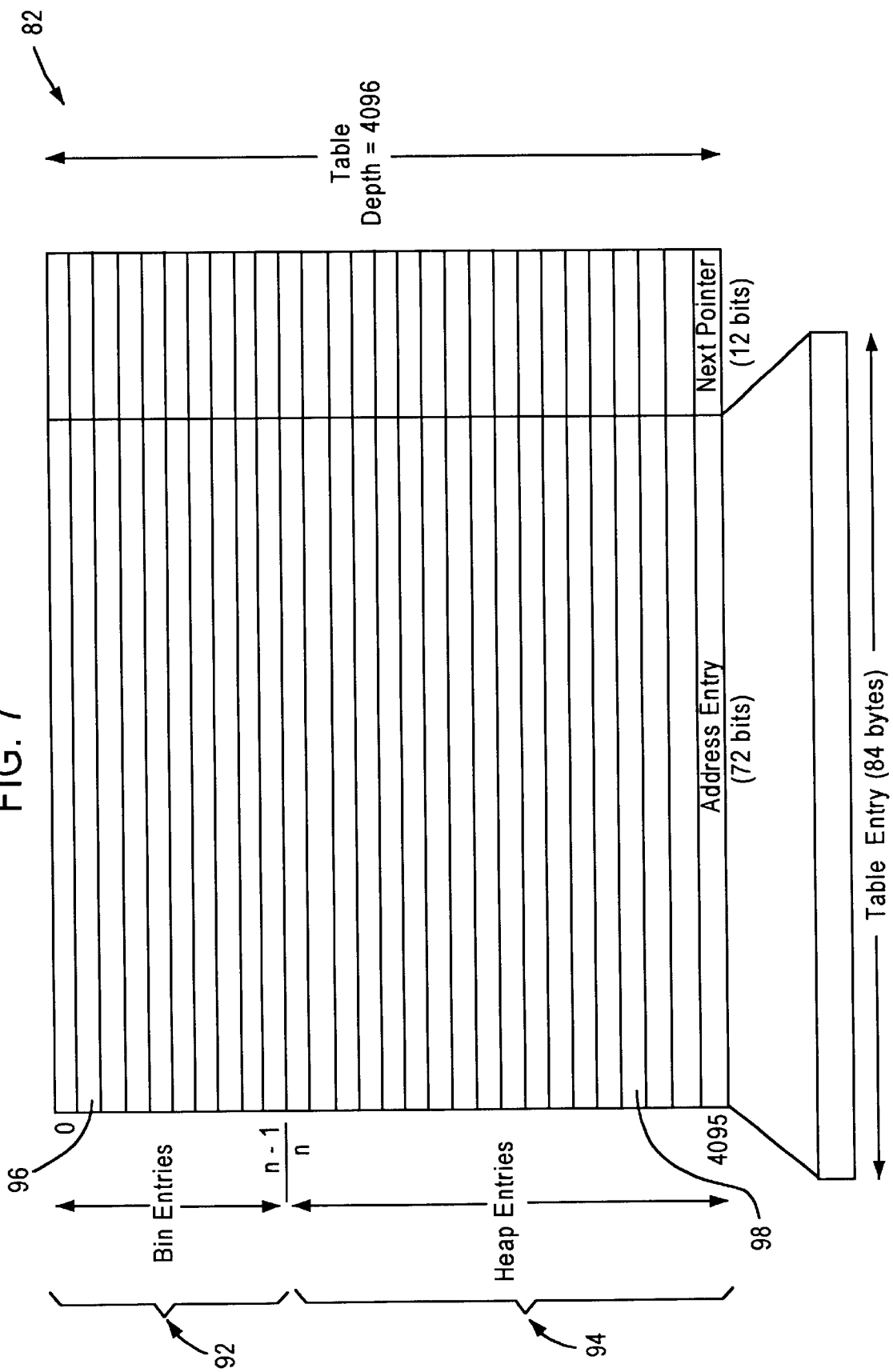
FIG. 7 illustrates the composition of the IRC address table of FIG. 6.

FIG. 7 illustrates the organization of the IRC address table 82. The IRC address table 82 contains an array of 4096 entries. The first "n" entries 92 are referred to as "bin entries" and have addresses from "0" to "n−1". The remaining entries 94 are referred to as "heap entries" and have addresses from "n" to "4095". Each of the table entries includes a 72-bit address entry field and a 12-bit "next pointer" field.

Figure 8:
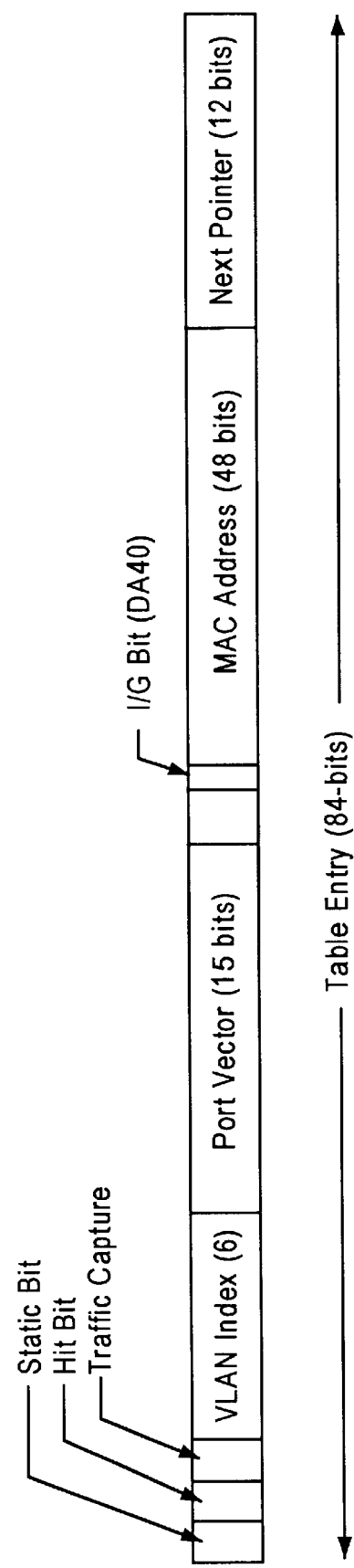
FIG. 8 illustrates the format of an IRC address table entry of the IRC address table of FIG. 7.

FIG. 8 illustrates the composition of each 84-bit table entry shown in FIG. 7. The hit bit is used for address entry "aging" to delete entries from the address table 82 that have not been used in a predetermined amount of time. The static bit is used to prevent deletion of an address entry.

The traffic capture bit identifies traffic capture source and destination MAC addresses for mirroring MAC conversations to the management queue 68.

The VLAN index field is a 6-bit field used to reference a 12-bit VLAN identifier (ID). The VLAN index-to-VLAN ID table 86, shown in FIG. 6, contains the mapping associations. The switch 12 receives both tagged and untagged frames. When the switch 12 receives untagged data frames, i.e., without VLAN tag information, the IRC 40 assigns a VLAN index from the VLAN port-to-index table 88, shown in FIG. 6, based on the receive port on which the frame is received. The VLAN index-to-ID table 86 and the VLAN port-to-index table 88 are located with the configuration and status registers 52. However, in alternative configurations, the tables 86 and 88 may be located within the IRC 40.

The port vector is a 15-bit field that provides a forwarding descriptor with a vector identifying the port(s) to which the frame should be forwarded.

The MAC address field is a 48-bit field that includes addresses for both source addresses and destination addresses. The addresses can be unicast, multicast or broadcast. An individual/group (I/G) bit is also included in the MAC address field.

In the exemplary embodiment of the present invention, the host CPU 32 functions as the management entity and is connected to the IRC 40 via the CPU IF 50. Alternatively, a management MAC may be connected to the CPU IF 50 to function as the management entity. The host CPU 32 is responsible for initializing the values in the address table 82. Upon power-up, the host CPU 32 loads values into the bin entries 92 based on the network configuration, including VLAN configurations. The heap entries 94 are not fixed at power-up and are used for adding entries to the address table 82. The IRC 40 uses the specific fields of the address table 82 to make frame forwarding decisions when frames are received in the switch 12. More specifically, the IRC 40 uses engines 200–230 to generate frame forwarding information and to create a forwarding descriptor for output to the port vector FIFO 56.

Logic engines 200–230, as discussed previously, are separate logic devices and are able to process data frames in parallel, thereby increasing data throughput as compared to systems which employ a single decision making device. In other words, each logic engine is able to perform its respective processing on a different data frame simultaneously with the other respective logic engines. Advantageously, the data throughput of the multiport switch 12 including engines 200–230 may increase up to fourfold, as compared to a network switch that employs a single decision making device, since four data frames may be processed simultaneously. The operation of each logic engine, according to the exemplary embodiment, will be described below.

The ingress rules engine 200 performs a variety of pre-processing functions for each frame header. For example, ingress rules engine 200 checks to see if a data frame was received with errors by reading the frame status information stored with the respective frame headers in rules queue 120. When the ingress rules engine 200 determines that a receive error has occurred, the ingress rules engine 200 constructs a forwarding descriptor with a null port vector, e.g., a port vector with all zeros or some other predetermined value, that will cause the frame to be discarded. Optionally, frames with errors may be forwarded to the host CPU 32 for diagnostic purposes. However, in either case, the ingress rules engine 200 transmits the forwarding descriptor with the null port vector directly to the port vector FIFO 56, without processing by engines 210, 220 and 230. Advantageously, this saves processing time associated with performing searches of the address table 82 for a data frame that contains erroneous data.

The ingress rules engine 200 also checks the source address of the received frame to determine whether the Individual/Group (I/G) bit is set. If the I/G bit is set, indicating a multicast source address, the ingress rules engine 200 handles the frame as if the frame was received with errors. That is, the ingress rules engine 200 creates a forwarding descriptor with a null port vector and transmits the forwarding descriptor to the port vector FIFO 56.

The ingress rules engine 200 also checks the destination address (DA) of the frame to determine if the frame should be sent to the management entity, e.g., host CPU 32. Specifically, the ingress rules engine 200 looks for Bridge Protocol Data Units (BPDUs), Generic Attribute Registrations Protocol (GARP) frames, MAC Control Frames and frames with certain Physical MAC addresses. The ingress rules engine 200 identifies these types of frames based on their specific destination address information. When the ingress rules engine 200 detects a match with one of the above DAs, the ingress rules engine 200 constructs a forwarding descriptor identifying the management port. The ingress rules engine 200 then transmits the forwarding descriptor directly to the port vector FIFO 56, bypassing engines 210–230.

The ingress rules engine 200 also determines whether SA and DA lookups will be performed by engines 210 and 220, respectively, based on whether learning and forwarding are set in the respective port IRC control registers 114a–m, illustrated in FIG. 6. According to the exemplary embodiment of the invention, the multiport switch 12 includes one port IRC control register 114 for each of the twelve 10/100 Mb/s ports and for the 1 Gb/s port. In alternative configurations, a single register could be used to store the appropriate control information for the respective ports.

Referring to FIG. 6, each port IRC control register 114 includes a learn bit and a forward (frwrd) bit. A set learn bit allows the IRC to "learn" unknown MAC source addresses received by the corresponding port, i.e., add new entries not stored in address table 82. A set frwrd bit allows frames received by the corresponding port to be forwarded to other ports and allows frames received by other ports to be transmitted from this port.

When learning is set and forwarding is not set in the port IRC control register 114 corresponding to the port on which the frame was received, only the SA lookup is performed. That is, the SA lookup is performed so that a new entry may be added to the address table 82 and the SA lookup engine 210 generates a forwarding descriptor with a null port vector. The SA lookup engine 210 then transmits the forwarding descriptor directly to the port vector FIFO 56, bypassing engines 220 and 230. When learning and forwarding are both set in the port IRC control register 114 corresponding to the receive port, both SA and DA lookups are performed, as discussed in more detail below. When learning and forwarding are both clear in the port IRC control register 114 corresponding to the receive port, neither the SA nor DA lookups is performed. In this case, the ingress rules engine 200 generates a forwarding descriptor with a null port vector, which is transmitted directly to the port vector FIFO 56.

Optionally, the ingress rules engine 200 performs VLAN ingress filtering to prevent the multiport switch 12 from forwarding a frame that does not belong to a VLAN associated with the receiving port. The port IRC control registers 114 each include an ingress bit which, when set, indicates that ingress filtering is enabled. Ingress filtering according to the exemplary embodiment of the present invention proceeds as follows.

Initially, the ingress rules engine 200 determines whether a received frame has no VLAN tag header of if the VLAN tag header has a VLAN ID equal to "0". When the frame has no VLAN tag header or the VLAN ID is "0", the ingress rules engine 200 does not perform ingress filtering regardless of the state of the ingress bit. Otherwise, the ingress rules engine 200 retrieves the VLAN index corresponding to the frame's VLAN ID from the VLAN index-to-ID table 86. If the frame's VLAN ID is not found in this table, the ingress rules engine 200 forwards the frame to the management port only.

Next, the ingress rules engine 200 determines whether the received frame belongs to a VLAN associated with the receiving port. According to the exemplary embodiment, the multiport switch 12 includes a VLAN member set table 89, illustrated in FIG. 6, that indicates which VLANs are associated with each port. The VLAN member set table 89 includes fifteen 64-bit entries corresponding to ports 0–14, i.e., the management port, 12 MAC ports 20, 1 Gb/s port 24 and expansion port 30, respectively. Each 64-bit entry contains a bit map that indicates which VLAN identifiers are associated with the corresponding port. For example, if bit "n" of the entry corresponding to port "x" is set, port x is in the member set for the VLAN whose index is n. VLAN index n in turn identifies a VLAN ID in the VLAN index-to-ID table 86.

The ingress rules engine 200 examines the bit that corresponds to the VLAN index in the VLAN member set table 89 for the entry that corresponds to the receiving port. When this bit is "0", indicating that the frame does not belong to a VLAN associated with the receiving port, the ingress rules engine 200 generates a forwarding descriptor with a null port vector so that the frame will be discarded. In this manner, the ingress rules engine 200 prevents a frame that does not belong to a VLAN associated with the receiving port from being forwarded.

After processing by ingress rules engine 200, the IRC 40 performs SA and DA searches of address table 82, based on whether learning and forwarding are enabled as discussed above. The multiport switch 12 needs to make frame forwarding decisions relatively quickly, since multiple data frames may be received by the multiport switch 12 simultaneously. Hence, in the exemplary embodiment of the present invention, a hashing scheme is used to search only a subset of the address entries, as described below. The memory structure of FIG. 7 provides an indexed arrangement, where a given network address will be assigned to a corresponding bin. In other words, each bin entry 96 is configured to reference a plurality of table entries (i.e., heap entries) 98. Hence, the SA lookup engine 210 performs a search of the address table 82 by first accessing a specific bin 96 pointed to by a hash key, and then searching the entries within (i.e., referenced by) the corresponding bin to locate the appropriate match.

Each bin entry 96 is the starting point for the search by the SA lookup engine 210 for a particular address within the address table 82. A bin entry may reference no addresses (i.e., be empty), may reference only one address within the bin entry location, or may reference a plurality of addresses using a linked list chain structure.

Figure 9:
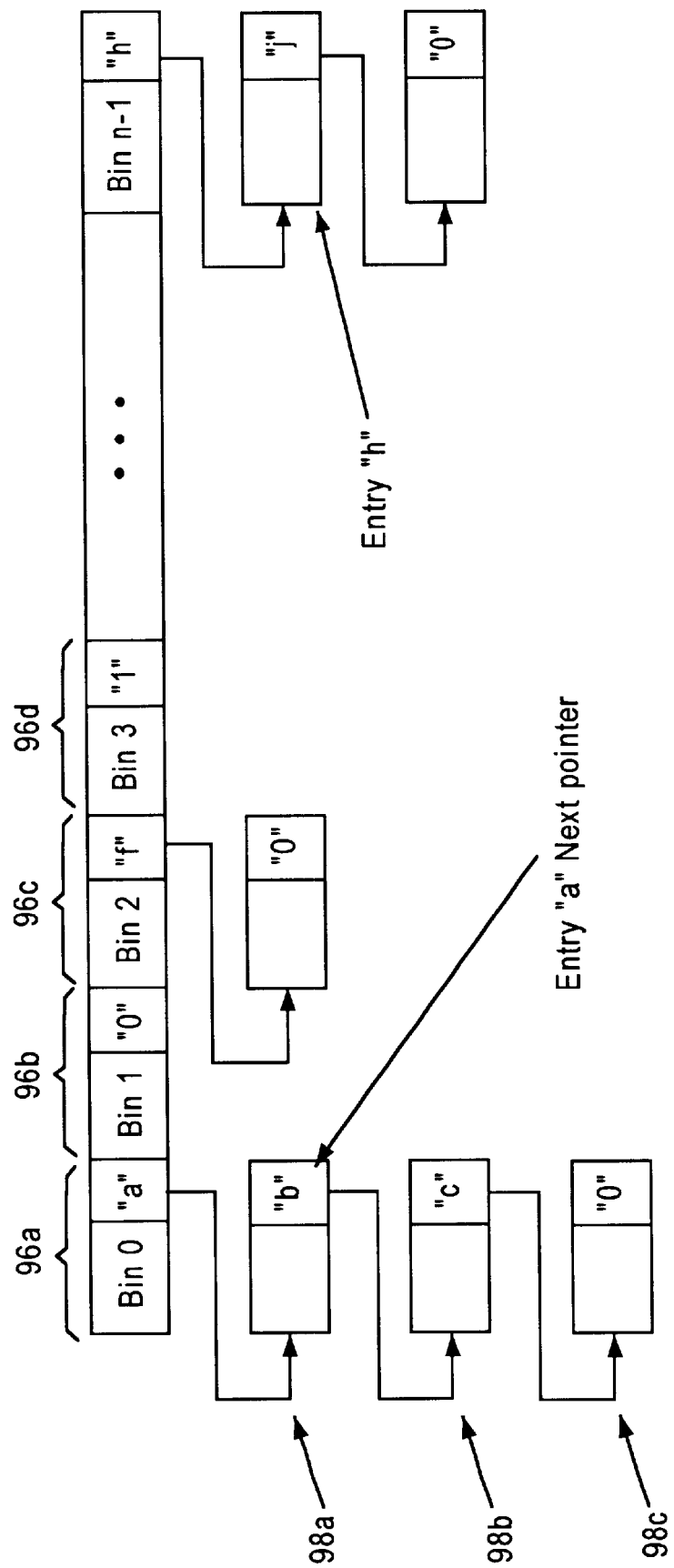
FIG. 9 illustrates linked list chains for identifying table entries relative to a selected bin.

FIG. 9 is a diagram illustrating bin entries referencing a different number of table entries. Each of the bin entries 96 and heap entries 98 includes the 72-bit address entry and a 12-bit "next pointer" field. The "next pointer" field associated with the bin entry 96 identifies the location of the next entry in the chain of linked list addresses. For example, Bin 3, 96d, of FIG. 9 does not have any associated table entries. In such a case, the 72-bit address entry equals zero (or another null value), and the bin's corresponding "next pointer" field will have a value of "1", indicating no entries for the corresponding bin. If a bin such as Bin 1, 96b, contains a single table entry, the bin entry will store the switching logic data for that single address in its address entry field, and store the value "zero" in the "next pointer" field, indicating there are no further address entries in the chain. Bin 0, 96a, however, references four addresses by using the "next pointer" field to identify the location of the next entry in the chain. The additional entries 96b–96d in the bin are linked in a linear list, as shown in FIG. 9. Thus, the first entry of Bin 0 is stored in the address entry field of the bin entry 96a and the next entry (heap entry 98a) is referenced by address entry "a" in the next pointer field of the bin entry 96a.

Figure 10:
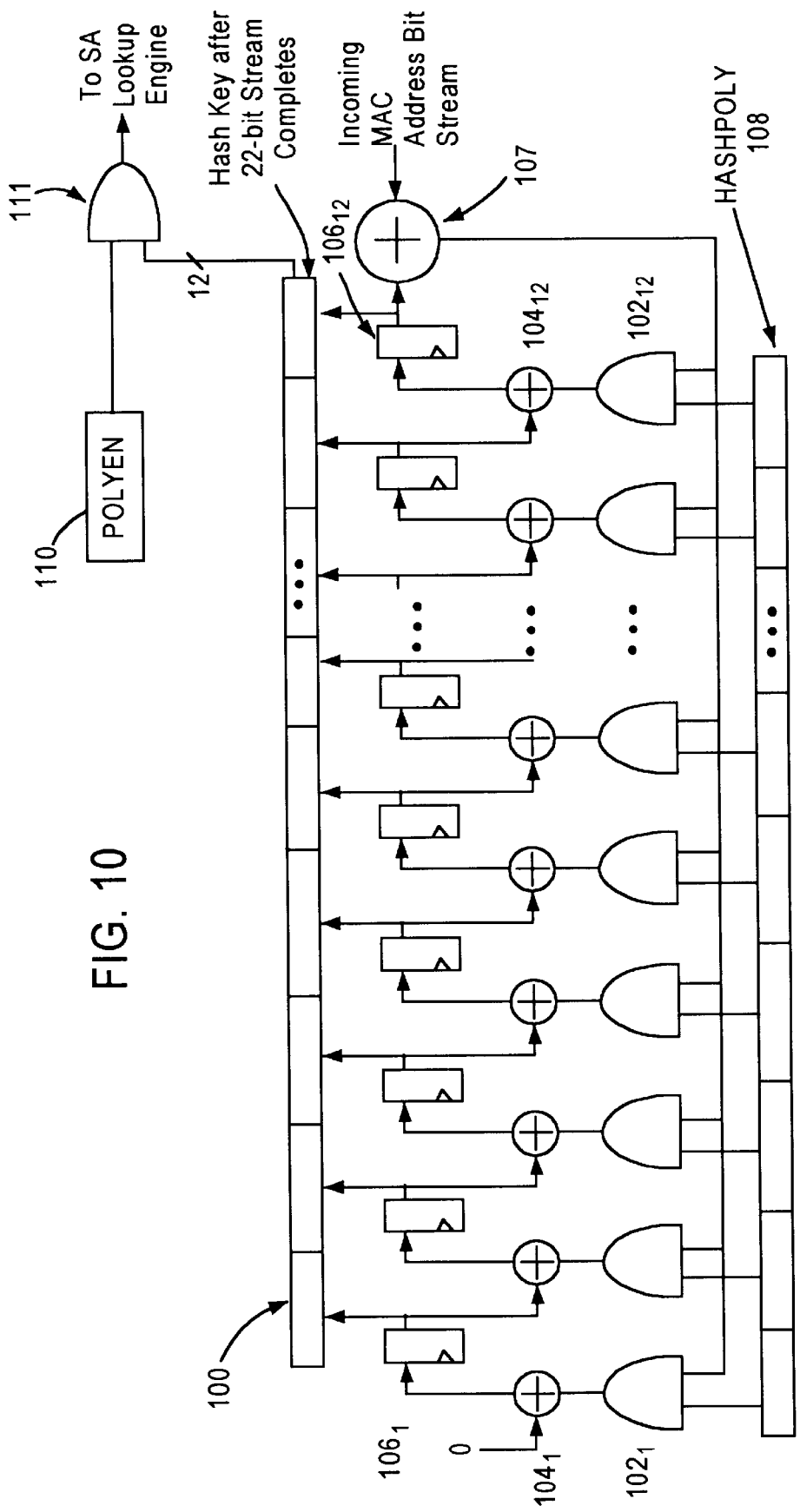
FIG. 10 illustrates a hash function circuit used with the internal rules checker of FIG. 2.

The SA lookup engine 210 performs hash searches of the IRC address table 82 to find entries associated with the source address and VLAN index of a received data frame. FIG. 10 is a block diagram illustrating an exemplary hash function circuit 100 used in conjunction with the SA lookup engine 210 in accordance with an embodiment of the present invention. The hash function circuit 100 includes a series of AND gates 102, a series of exclusive OR (XOR) gates 104, and a shift register 106. A user-specified hash function, stored in a user-programmable register (HASHPOLY) 108, includes a 12-bit value defining the hash polynomial used by the hash function circuit 100. Exemplary hash polynomials for the hashing function of the present invention are $x^{12}+x^7+x^4+x^3+1$, which has a HASHPOLY of 0000 1001 1001, and $X^{12}+x^6+x^4+x+1$, which has a HASHPOLY of 0000 01010011. The $x^{12}$ term is assumed to always equal "1", and therefore is not stored in the HASHPOLY register 108. Other polynomials may also be used for HASHPOLY based on the particular design requirements.

The hash function circuit 100 generates the hash key using the source address of the data packet according to a user-specified hash function. Initially, the IRC controller 82 concatenates the 16 least significant bits of the source address of the data packet with the VLAN index to create a search key. Next, the hash function circuit 100 XORS, via XOR 107, the search key with the output of the register 106$_{12}$.

The hash function circuit 100 ANDs, via AND gates 102, the output of XOR 107 bitwise with HASHPOLY. The hash function circuit 100 then XORs the output of AND gates 102 with the output of register 106. After the entire search key has been processed, the hash function circuit 100 outputs a 12-bit hash key.

From the 12-bit hash key, the SA lookup engine 210 calculates a bin number for searching the appropriate bin list in address table 82. More particularly, the SA lookup engine 210 uses the lower POLYEN bits of the hash key to generate the bin number. The bin number falls in the range of [0, n−1] where n=$2^{POLYEN}$ and the value of POLYEN is programmed by the host CPU 32 and stored in register 110. The hash key output by the hash function circuit 100 is provided to a logic circuit, for example a 12-bit parallel AND gate 111, that selectively outputs the lower significant bits of the hash key based upon a polynomial enable value (POLYEN) stored in register 210. The field "POLYEN" defines how many bits of the hash key are used to create the bin number. For example, if POLYEN=5, then the SA lookup engine 210 uses the lower five bits of the hash key. Hence, the hash key output by the logic circuit 100 is based upon masking the 12-bit hash key using the stored register value POLYEN in register 110.

After the bin number is calculated, the SA lookup engine 210 searches the bin list of the particular bin for an address entry whose address and VLAN index fields match the source address (SA) and VLAN index of the received frame.

If the SA lookup engine 210 finds an address entry whose address and VLAN index match the SA and VLAN index of the frame, the SA lookup engine 210 sets the hit bit for that address entry. Optionally, the hit bit may be used for address entry aging. If the SA lookup engine 210 does not find a match and learning is enabled, the SA lookup engine 210 constructs a new entry in the IRC address table 82 using the information from the received frame. After the SA lookup engine 210 completes the search and adds a new entry, if necessary, the DA lookup engine 220 performs a search of the address table 82, assuming that forwarding is set in the corresponding port IRC control register 114. Specifically, the DA lookup engine 220 searches the address table 82 for an address entry whose address and VLAN index match the destination address (DA) and VLAN index of the frame. The DA lookup engine 220 uses the 12-bit hash function circuit 100, illustrated in FIG. 10, to generate a 12-bit hash key for the DANLAN index search. The DA lookup engine 220 uses the lower POLYEN bits of the hash key to calculate the bin number in the address table 82. The DA lookup engine 220 then searches the appropriate bin list for a DA/VLAN index match in the address table 82. If a match is found, the DA lookup engine 220 uses the port vector field of the address entry and passes the port vector field information to the egress rules engine 230. When the DA lookup engine 220 cannot find a DANLAN index match, the frame must be "flooded" to all members of the VLAN. In this case, the DA lookup engine 220 sets the port vector to indicate that all ports are to transmit the frame.

After, the DA lookup engine 220 generates the port vector, the egress rules engine 230 receives the port vector information along with the receive port number and VLAN ID information. The egress rules engine 230 then creates a forwarding descriptor for the frame, as discussed in detail below.

Figure 11:
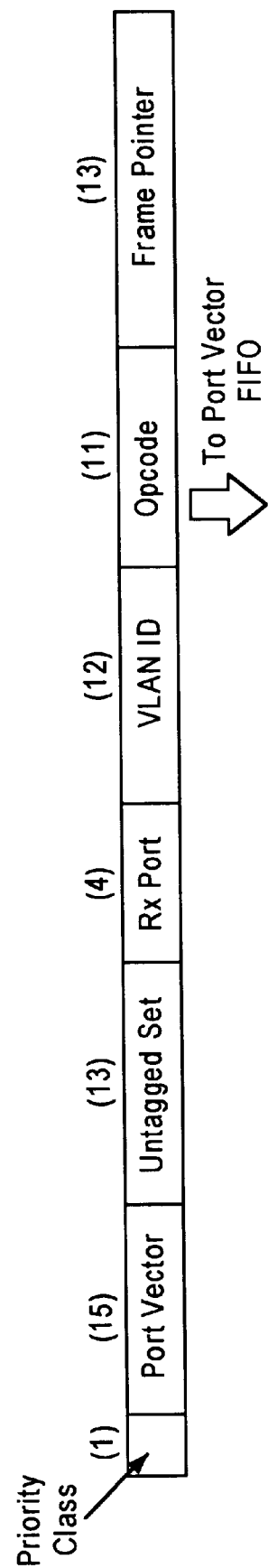
FIG. 11 illustrates the composition of the forwarding descriptor in accordance with an embodiment of the present invention.

FIG. 11 illustrates the composition of the forwarding descriptor according to an embodiment of the present invention. Referring to FIG. 11, the priority class field is a one-bit field that indicates the output priority queue in which the frame pointer should be placed, e.g., high priority or low priority.

The port vector field is a 15-bit field that identifies each port(s) that should receive the data frame for transmission to its destination address. Bit 0 of the port vector field corresponds to Port 0 (the management port), bits 1–12 correspond to MAC ports 1–12 respectively (the 10/100 Mb/s ports), bit 13 corresponds to the gigabit port 24 and bit 14 corresponds to the expansion port 30.

The untagged set field is a four-bit field that indicates which ports should remove VLAN tag headers before transmitting frames. The untagged set is obtained from an untagged set table. The Rx port is a four-bit field that indicates the port from which the frame was received.

The VLAN ID field is a 12-bit field that includes the VLAN identifier associated with the frame. The opcode is an 11-bit field that contains instructions about how the frame should be modified before transmission and information that the host CPU 32 can use for processing frames from the management queue. The frame pointer is a 13-bit field that contains the location of the frame stored in external memory 36.

When VLAN ingress filtering is set, the egress rules engine 230 performs VLAN member set checking. The egress rules engine 230 performs this check by examining the bit that corresponds to the frame's VLAN index in the VLAN member set table entry that corresponds to the output port. If this bit is not set, the egress rules engine 230 masks that port from the port vector.

After the egress rules engine 230 generates the forwarding descriptor, the egress rules engine 230 outputs the forwarding descriptor to the port vector FIFO 56 for queuing, as shown in FIG. 3.

Described has been a system and method for storing frame header information in a network switch for processing by a decision making engine. An advantage of the invention is that data frames are able to transmitted to an external memory while the frame header is stored on the multiport switch 12 and processed by a decision making engine. An advantage of the invention is that the data throughput of the switch increases as compared to a switch that transmits data frames to an external memory and then transmits the frames back to the switch for processing by a decision making device. Another advantage of the invention is that the scheduler 80 enables snooping to be done on a single write bus, thereby simplifying the logic required to store the frame header information on the multiport switch 12.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A multiport switch configured for controlling communication of data frames between stations, comprising:
   a receive device configured to receive a data frame and transmit the data frame on an internal bus to an external memory interface; and
   a decision making engine configured to:
   detect when data frame information is being transmitted on the internal bus, and store a portion of the data frame on the multiport switch, when the decision making engine detects data frame information is being transmitted on the internal bus.

2. The multiport switch of claim 1, wherein the portion of the data frame information comprises frame header information including a source address and destination address of the data frame.

3. The multiport switch of claim 2, comprising:

a memory configured to store the frame header information along with frame pointer information indicating where the data frame is stored in an external memory.

4. The multiport switch of claim 3, wherein the memory comprises:

a plurality of queues corresponding to ports on the multiport switch, wherein each of the plurality of queues is configured to store a predetermined number of frame headers.

5. The multiport switch of claim 1, comprising:

a scheduler coupled to the external memory interface and configured to grant the receive device access to the internal bus at predetermined times.

6. The multiport switch of claim 1, wherein the decision making engine is configured to process the portion of the data frame and generate data forwarding information for the data frame.

7. The multiport switch of claim 1, wherein the receive device is configured to transmit a signal indicating the start of transmission of the data frame information on the internal bus.

8. In a multiport switch that controls communication of data frames between stations, a method of storing data frame information, comprising:

receiving a data frame;

transmitting the data frame on an internal bus to an external memory interface;

detecting when data frame information is being transmitted on the internal bus; and storing a portion of the data frame on the multiport switch, when transmission of data frame information on the internal bus is detected.

9. The method of claim 8, wherein the portion of the data frame comprises frame header information including a source address and destination address of the data frame.

10. The method of claim 9 wherein the multiport switch comprises a plurality of ports, the storing step comprising:

storing the frame header information in a queue configured to store a predetermined number of frame headers for each of the plurality of ports.

11. The method of claim 10, comprising:

detecting whether the data frame was received without errors and storing an error indication with the frame header information when an error is detected.

12. The method of claim 9, comprising:

processing the frame header information; and generating data forwarding information.

13. The method of claim 8, comprising:

asserting a start of transmission signal when a data frame is being transmitted on the internal bus, wherein the start of transmission signal is detected by a decision making device.

14. A multiport switch configured for controlling communication of data frames between stations, comprising:

a plurality of receive devices corresponding to ports on the multiport switch, each of the receive devices configured to receive data frames and transmit the data frames on an internal bus to an external memory interface;

a scheduler configured to grant each respective receive device access to the internal bus at predetermined periods of time; and a decision making engine configured to:

detect when data frame information is being transmitted on the internal bus, and store a portion of the data frame information on the multiport switch.

15. The multiport switch of claim 14, wherein the portion of the data frame information comprises frame header information including a source address and destination address of the data frame along with virtual local area network (VLAN) information when VLAN information is included with the data frame.

16. The multiport switch of claim 15, comprising:

a memory configured to store the frame header information along with frame pointer information indicating where the data frame is stored in an external memory.

17. The multiport switch of claim 16, wherein the memory comprises:

a plurality of queues corresponding to the ports on the multiport switch, wherein each of the plurality of queues is configured to store a predetermined number of frame headers.

18. The multiport switch of claim 14, wherein the decision making engine is configured to process the portion of the data information and generate data forwarding information for the data frame.

* * * * *